(12) United States Patent
Ritala

(10) Patent No.: US 7,706,749 B2
(45) Date of Patent: Apr. 27, 2010

(54) SUPPORTING A SETUP OF A WIRELESS CONNECTION

(75) Inventor: Markus Ritala, Ylöjärvi (FI)

(73) Assignee: Nokia Corporation, Espoo (FI)

( * ) Notice: Subject to any disclaimer, the term of this patent is extended or adjusted under 35 U.S.C. 154(b) by 1206 days.

(21) Appl. No.: 11/269,142

(22) Filed: Nov. 7, 2005

(65) Prior Publication Data

US 2007/0105497 A1    May 10, 2007

(51) Int. Cl.
*H04B 7/00* (2006.01)
(52) U.S. Cl. ............. 455/41.2; 455/556.1; 455/435.1; 455/552.1; 455/557; 709/220; 709/227; 370/338; 370/349; 370/328; 370/310.2
(58) Field of Classification Search ............. 455/41.2, 455/556.1, 435.1, 552.1, 557; 709/220, 227; 370/338, 349, 328, 310.2
See application file for complete search history.

(56) References Cited

U.S. PATENT DOCUMENTS

| | | | |
|---|---|---|---|
| 7,076,209 B2 * | 7/2006 | Sugikawa et al. | 455/41.2 |
| 7,123,878 B1 * | 10/2006 | Heinonen et al. | 455/41.2 |
| 7,245,602 B2 * | 7/2007 | Skubic et al. | 370/338 |
| 7,324,462 B1 * | 1/2008 | Page et al. | 370/255 |
| 7,325,048 B1 * | 1/2008 | Milito et al. | 709/220 |
| 7,373,109 B2 * | 5/2008 | Pohja et al. | 455/41.2 |
| 2002/0085719 A1 * | 7/2002 | Crosbie | 380/248 |
| 2002/0131445 A1 * | 9/2002 | Skubic et al. | 370/465 |
| 2004/0009748 A1 * | 1/2004 | Heinonen et al. | 455/41.2 |

OTHER PUBLICATIONS

Specification of the Bluetooth System, Master Table of Contents and Compliance Requirements, Specification vol. 0; Nov. 4, 2004.
Specification of the Bluetooth System, Architecture & Terminology Overview, Specification vol. 1; Nov. 4, 2004.
Specification of the Bluetooth System, Core System Package (Controller volume), Specification vol. 2; Nov. 4, 2004.
Specification of the Bluetooth System, Core System Package (Host volume), Specification vol. 4; Nov. 4, 2004.

* cited by examiner

*Primary Examiner*—Marceau Milord
(74) *Attorney, Agent, or Firm*—Alfred A. Fressola; Ware, Fressola, Van Der Sluys & Adolphson LLP

(57) ABSTRACT

A Bluetooth™ enabled device comprises a contact database arranged for storing Bluetooth™ identifiers identifying other Bluetooth™ enabled devices. This allows setting-up a Bluetooth™ connection to another Bluetooth™ enabled device based on a Bluetooth™ identifier stored in this contact database and identifying the other Bluetooth™ enabled device. New Bluetooth™ identifiers identifying another Bluetooth™ enabled device may be stored in the contact database of said first Bluetooth™ enabled device.

26 Claims, 3 Drawing Sheets

SUPPORTING A SETUP OF A WIRELESS CONNECTION

FIELD OF THE INVENTION

The invention relates to a Bluetooth™ enabled device and to methods for supporting in such a Bluetooth™ enabled device a setup of a Bluetooth™ connection. The invention relates equally to software program products storing software codes for supporting in a Bluetooth™ enabled device a setup of a Bluetooth™ connection.

BACKGROUND OF THE INVENTION

Various electronic devices support a communication via a Bluetooth™ connection as specified in the "BLUETOOTH SPECIFICATION Version 2.0+EDR [vol 0]" 4 Nov. 2004.

The Bluetooth™ specification contains information required to ensure that diverse electronic devices supporting the Bluetooth™ wireless technology can communicate with each other worldwide via short-range radio links. The specification is aimed at providing a standard for low complexity low-cost wireless connections between portable and/or fixed devices, in particular devices which are located within a range of 10 meters to each other. An example for the employment of such a Bluetooth™ short-range radio link is a wireless connection between a laptop and a printer, or between two mobile phones.

To each Bluetooth™ enabled device, a unique identifier is associated, which is referred to for instance as Bluetooth™ Identifier (BT-ID) or Bluetooth™ Address. A Bluetooth™ enabled device has to known the BT-ID of another Bluetooth™ enabled device, in order to be able to setup a connection to this other Bluetooth™ enabled device by means of a paging procedure.

Inquiry procedures enable a device to determine the BT-ID of all devices within its range to which a connection would be possible. In these procedures, a first device that wishes to establish a connection to some other device periodically transmits an inquiry message as broadcast message. The inquiry message has the form of an identity packet (ID packet) and might also include an indication of the type of devices that are to respond.

All devices that are willing to establish upon an inquiry a connection to some other device perform a scanning for such inquiry messages in an inquiry scan substate. The length of a scan period in which such a scanning is performed is denoted $T_{w\_inquiry\_scan}$ and should lie in a range of 10.625 ms to 2.56 s. The scan interval between two consecutive scans is denoted $T_{inquiry\_scan}$ and has a maximum value of 2.56 s. Alternatively, a continuous scanning could be carried out.

When a scanning device detects an inquiry message for which it was scanning, it will respond with a response message, more specifically with a Frequency Hop Synchronization (FHS) packet, carrying parameters of the device. These parameters comprise e.g. the BT-ID of the scanning device. However, in order to avoid a conflict when several devices are responding to an inquiry message at the same time, a further protocol is employed, before a response message is allowed to be transmitted. A similar problem may occur with colliding inquiring messages at a scanning device, when several devices are inquiring at the same time for other device to which they might establish a connection. According to this protocol, when a device detects an inquiry message, it generates a random number RAND between 0 and 1023. The device will then go back to sleep or to some other preceding state for the duration of a number of slots corresponding to the generated random number RAND. The duration of such a back-off is thus 0-0.64s. After the at least RAND time slots, the device will return to the inquiry scan substate and scan again for the same inquiry message detected before. Only when such a further inquiry message is received, the device turns into an inquiry response substate and transmits an FHS packet to the inquiring device, before returning again to the inquiry scan substate.

In between the transmissions of the inquiry message, the inquiring device scans for inquiry response messages. With the information in the received response messages it is then able to establish a connection to the responding device.

An additional problem with the setup time arises when two or more devices receive the ID packet. Then it is possible that during the inquiry procedure, the inquiring device receives multiple FSH packets and begins the paging process, which is used for establishing a connection with a specific device, which may at first be the 'wrong' device.

On the whole, setting up a Bluetooth™ connection may take a considerable time.

In some situations, the time required for the setup may be particular annoying. For example, if a user of a first Bluetooth™ enabled device desires to send some files to a second Bluetooth™ enabled device belonging to a friend via a Bluetooth™ connection, the user has to search the second device every time, even if a Bluetooth™ connection has been used several times before between exactly these two devices, and if the user knows that the second device is near, that Bluetooth™ is switched on in the second device and that the required services are available.

Usually, previously found devices are presented in a Bluetooth™ search list. Thus, with some luck the user might find the desired device from this list. Nevertheless, in many cases, the user will have to perform a full search again.

Further, if there is a large number of Bluetooth™ enabled devices in the environment during a search, it might be almost impossible for a user to find the desired one among all found devices, in particular if some of these devices are not recognizable to the user.

SUMMARY OF THE INVENTION

It is an object of the invention to enhance the setup of a Bluetooth™ connection.

A Bluetooth™ enabled device is proposed, which comprises a contact database arranged for storing Bluetooth™ identifiers identifying other Bluetooth™ enabled devices.

Moreover, a contact database for a Bluetooth™ enabled device is proposed, which is arranged for storing Bluetooth™ identifiers identifying other Bluetooth™ enabled devices.

According to one aspect of the invention, moreover a first method for supporting in a first Bluetooth™ enabled device a setup of a Bluetooth™ connection is proposed. The method comprises setting-up a Bluetooth™ connection to another Bluetooth™ enabled device based on a Bluetooth™ identifier stored in a contact database of the first Bluetooth™ enabled device and identifying the other Bluetooth™ enabled device.

For this aspect of the invention, moreover a first software program product is proposed, in which a software code for supporting in a first Bluetooth™ enabled device a setup of a Bluetooth™ connection is stored. When being executed by a processing unit of the first Bluetooth™ enabled device, the software code realizes the first proposed first method.

According to another aspect of the invention, a second method for supporting in a first Bluetooth™ enabled device a setup of a Bluetooth™ connection is proposed. This method comprises storing a Bluetooth™ identifier identifying another Bluetooth™ enabled device in a contact database of the first Bluetooth™ enabled device.

For this aspect of the invention, moreover a second software program product is proposed, in which a software code for supporting in a first Bluetooth™ enabled device a setup of a Bluetooth™ connection is stored. When being executed by a processing unit of the first Bluetooth™ enabled device, this software code realizes the proposed second method.

The invention proceeds from the consideration that repeated searches by a first Bluetooth™ enabled device for a particular other Bluetooth™ enabled device can be avoided by storing its BT-ID permanently in the first Bluetooth™ enabled device. It is therefore proposed that the contact database of a device is extended to allow storing BT-IDs, for example in a similar manner as phone numbers and email-addresses.

It is an advantage of the invention that it is suited to accelerate the setup of a Bluetooth™ connection significantly. When sending a file via a Bluetooth™ connection, for example, conventionally most of the time is spend in the search for BT-ID of the device that is to receive the file. Thus, with the invention, the entire communication can be speeded up significantly.

Further, the invention allows providing a user with a list only of known Bluetooth™ enabled devices, which facilitates the user selection.

The processing means of the first Bluetooth™ enabled device can be realized by hardware and/or software. They may include for instance a processor executing software code.

The software program products can be for instance a separate memory component, a memory for implementation in a Bluetooth™ enabled device, a buffer used by a processor when executing the software code, etc.

In one embodiment of the invention, each Bluetooth™ identifier is stored in the contact database in the scope of a respective contact card, for instance in a dedicated BT-field of a contact card. Such contact cards may be enabled for a respective contact person or for a respective device.

In one embodiment of the invention, the first proposed method may comprise searching in a contact database for stored Bluetooth™ identifiers identifying other Bluetooth™ enabled devices. The method may further comprise presenting to a user a list of entries associated in the contact database to Bluetooth™ identifiers found in the search. The method may further comprise enabling a user to select of one of the presented entries for setting-up a Bluetooth™ connection to another Bluetooth™ enabled device, which other Bluetooth™ enabled device is identified by a Bluetooth™ identifier that is associated to the selected entry.

The listed entries may comprise for instance a contact person name, a device type and/or a device name. If the BT-ID of other Bluetooth™ enabled devices is associated in the list to the name of the user and/or to a freely selected device name, the user does not have to know the name of the other Bluetooth™ enabled device as used by the other Bluetooth™ enabled device.

Once a listed entry has been selected by a user, a Bluetooth™ connection may be set up to another Bluetooth™ enabled device, which other Bluetooth™ enabled device is identified by a Bluetooth™ identifier that is associated to the selected entry.

In some cases, a plurality of Bluetooth™ identifiers may be associated to an entry constituting a main entry. For example, for one contact person of whom the name is stored as a main entry, Bluetooth™ identifiers for various devices may be stored. The names of these devices may then be stores as subentries in the contact database. In this case, the list may comprise a separate entry for each combination of the main entry and each associated subentry. Alternatively, the list may comprise at first only the main entries. Only in a next step, a list of subentries may be presented upon a user selection of the main entry. The user may then be enabled to select of one of the presented subentries for setting-up a Bluetooth™ connection to another Bluetooth™ enabled device, which other Bluetooth™ enabled device is identified by a Bluetooth™ identifier that is associated to the selected subentry.

In case no Bluetooth™ identifier is found in the contact database during the search, the first method may further comprise performing an inquiry procedure for obtaining Bluetooth™ identifiers of Bluetooth™ enabled devices in the vicinity of the first Bluetooth™ enabled device. A Bluetooth™ enabled device for which a Bluetooth™ identifier has been obtained may then be presented to a user. Finally, a Bluetooth™ identifier that is associated to a Bluetooth™ enabled device may be stored in the contact database upon a request by a user.

In one embodiment of the invention, also the proposed second method comprises performing an inquiry procedure for obtaining Bluetooth™ identifiers, which identify Bluetooth™ enabled devices located in the vicinity of the first Bluetooth™ enabled device. The method may further comprise presenting a Bluetooth™ enabled device for which a Bluetooth™ identifier has been obtained to a user. The method may further comprise storing a Bluetooth™ identifier that is associated to a Bluetooth™ enabled device in the contact database upon a request by a user.

In this case, the inquiry procedure may also be initiated by a user, for example, though not exclusively, while having called a contact card from the contact database. A Bluetooth™ identifier associated to a selected Bluetooth™ enabled device may then be stored in the contact database as a part of the contact card.

After an inquiry procedure in either of the first method and the second method, the Bluetooth™ enabled devices for which a Bluetooth™ identifier has been obtained may be presented for instance one after the other to a user for storage or discarding. Alternatively, a list of all Bluetooth™ enabled devices for which a Bluetooth™ identifier has been obtained may be presented to a user, from which a user may select one for storage of the associated Bluetooth™ identifier in the contact database. The user may also be prompted to enter a name that is to be associated in the contact database to this Bluetooth™ identifier.

It has to be noted that Bluetooth™ identifiers for storage may further be obtained in various other ways than in an inquiry procedure. For instance, when another Bluetooth™ enabled device is trying to establish a Bluetooth™ connection to the first Bluetooth™ enabled device or has established a Bluetooth™ connection to the first Bluetooth™ enabled device, it will have provided its own Bluetooth™ identifier to the first Bluetooth™ enabled device. In this case, an option may be offered to a user of the first Bluetooth™ enabled device to store a Bluetooth™ identifier of the other Bluetooth™ enabled device. In case the user requests thereupon a storage of the Bluetooth™ identifier, the Bluetooth™ identifier may be stored in the contact database.

Processing means of the proposed Bluetooth™ enabled device may be adapted to carry out the steps of one or both of the presented methods and of any of the embodiments of the presented methods.

The invention may be implemented in any Bluetooth™ enabled device, for example, though not exclusively, in mobile devices like mobile phones or laptops.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
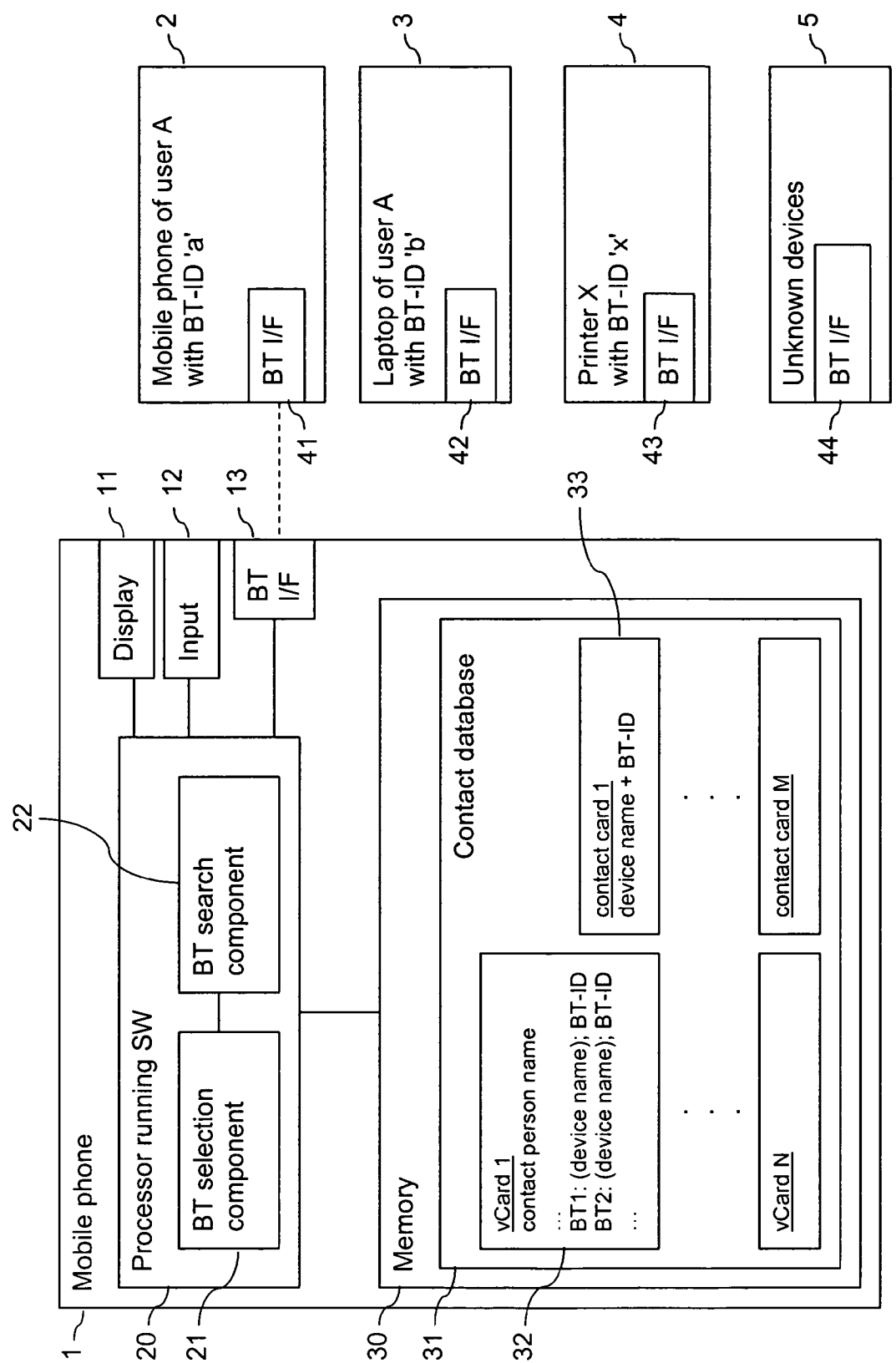
FIG. 1 is a schematic block diagram of a system with a device according to an embodiment of the invention.

FIG. 1 is a schematic block diagram of an exemplary system supporting facilitated and accelerated Bluetooth™ communications in accordance with an embodiment of the invention.

The system comprises a Bluetooth™ enabled device in which the invention is implemented. By way of example, the device is assumed to be a mobile phone 1. The system further comprises a plurality of other Bluetooth™ enabled devices 2, 3, 4, 5, which are located in the vicinity of the mobile phone 1.

The mobile phone 1 comprises a conventional display 11, conventional user input means 12 and a conventional Bluetooth™ interface BT-I/F 13. The input means 12 comprise softkeys which can be used for selecting options presented on the display 11 in specific Command Button Areas (CBA).

The mobile phone 1 further comprises a processor 20 which is adapted to run various software code components. The implemented software code components include a BT selection component 21 and a BT search component 22. The mobile phone 1 further comprises a memory 30. The processor 20 is adapted to access the display 11, the input means 12, the Bluetooth™ interface 13 and the memory 30.

The memory 30 stores a contact database 31. The contact database 31 is designed to include a plurality of electronic visiting cards (vCard) 32 and a plurality of other contact cards 33.

The vCard 32 may be enhanced conventional vCards. Each vCard 32 may comprise fields for the name of a contact person and for various other information, like phone numbers of this contact person, etc. According to an embodiment of the invention, the vCards 32 comprise moreover additional BT-fields for storing Bluetooth™ related information. Each BT-field may comprise a BT-ID and an optional device name or type. For instance, in a vCard for a contact person 'A', a first BT-field may comprise a first BT-ID 'a' and the device name 'mobile phone', while a second BT-field may comprise a second BT-ID 'b' and the device name 'laptop'. In a vCard for a contact person 'B', a single BT-field may comprise a BT-ID 'c' and the device name 'mobile phone'. In a vCard for a contact person 'B', a single BT-field may comprise a BT-ID 'd' and the device name 'mobile phone', etc.

The other contact cards 33 may be provided for contact information for devices which are not associated to a particular contact person. Each contact card 33 comprises at least a field for a device name and a BT-field for a BT-ID of the device. For instance, for a first printer, a first contact card may comprise as a device name the entry 'printer X' and a BT-ID 'x', while for another printer, another contact card may comprise as a device name the entry 'printer Y' and a BT-ID 'y'.

The other BT enabled devices may comprise for instance a mobile phone 2 with BT-ID 'a' of user 'A', a laptop 3 with BT-ID 'b' of user 'A', a printer 'X' 4 with BT-ID 'x', and various other, unknown Bluetooth™ enabled devices. Each of these Bluetooth™ enabled devices is provided with a respective Bluetooth interface 41, 42, 43, 44.

Figure 2:
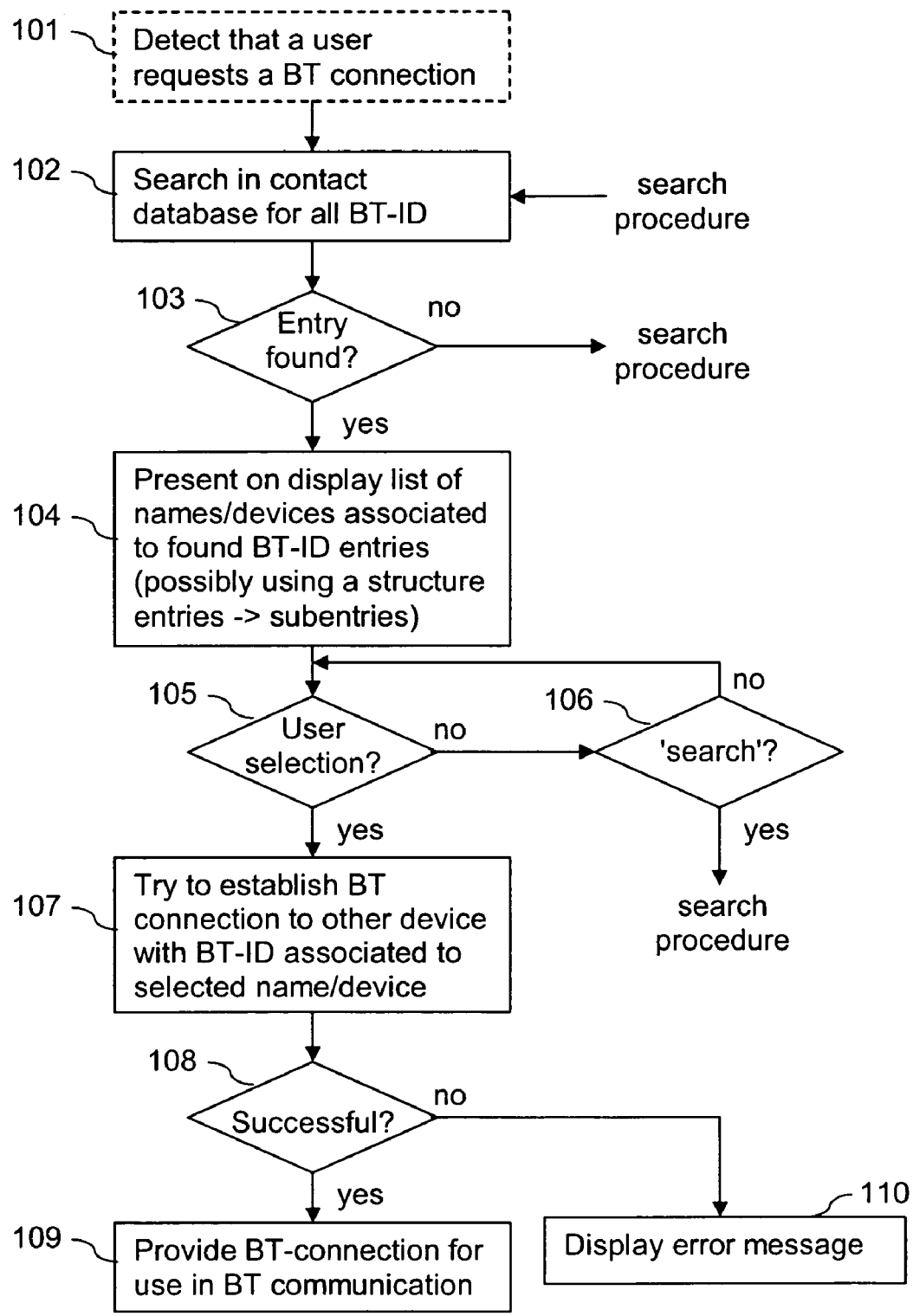
FIG. 2 is a flow chart illustrating a first operation in the system of FIG. 1.

A first operation in the system of FIG. 1 will now be described with reference to FIG. 2. FIG. 2 is a flow chart illustrating a selection procedure performed by the BT selection component 21 of mobile device 1.

A user of mobile phone 1 wants to send a file using a Bluetooth connection and selects a corresponding option using the input means 12. The user might want to send the file for example to a friend for further use or to a printer for a printout.

The BT selection component 21 detects that a user requests a Bluetooth™ connection, for instance for sending a file (step 101).

It searches thereupon in the contact database 31, and more specifically in the BT-fields of all available vCards 32 and of all available contact cards 33, for stored BT-ID entries (step 102). The search of step 102 could also be initiated by a search procedure, as will be explained further below with reference to FIG. 3. Therefore, step 101 is indicated with dashed lines.

Figure 3:
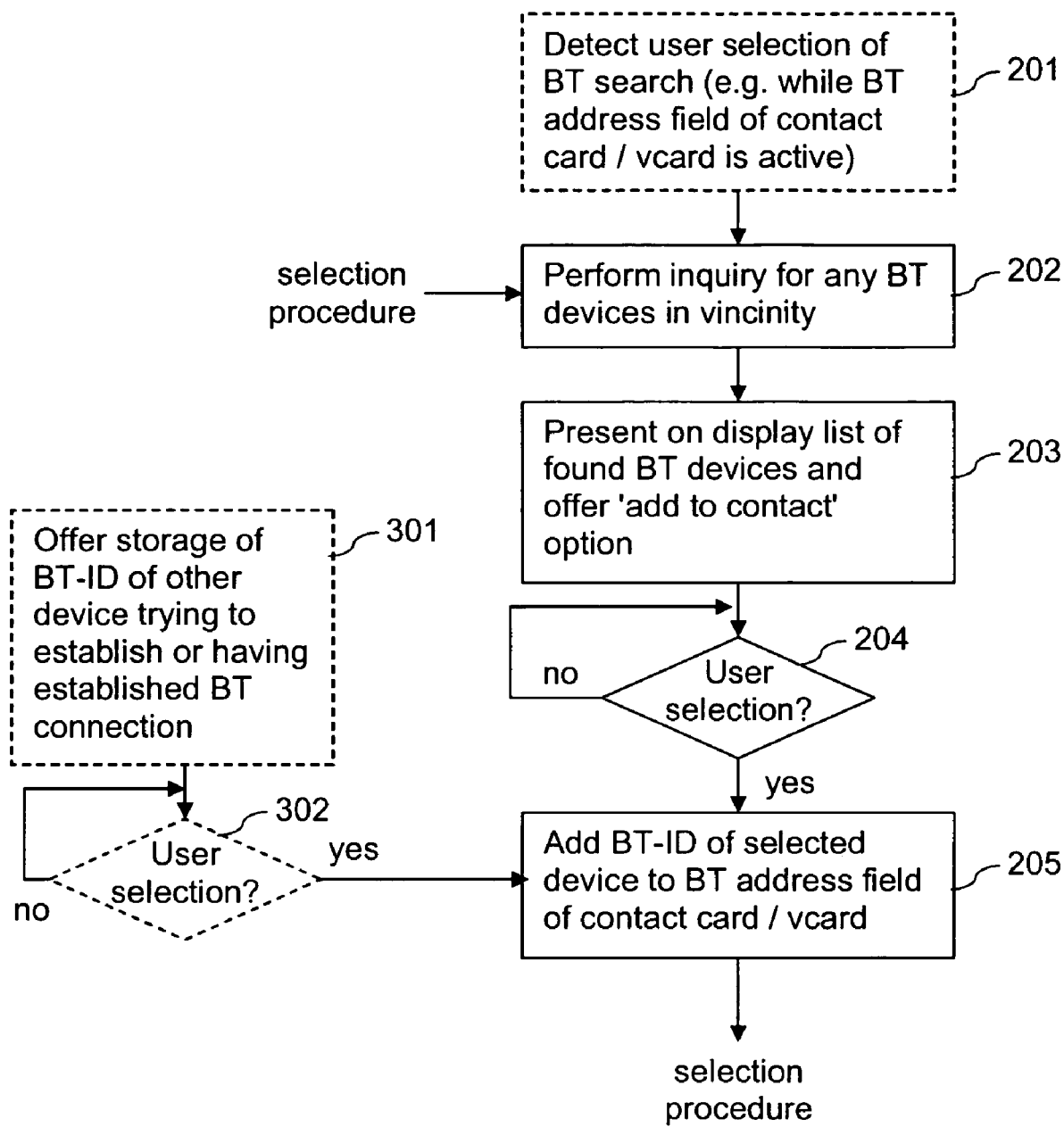
FIG. 3 is a flow chart illustrating a second operation in the system of FIG. 1.

In case no BT-ID entry is found (step 103), the BT selection component 21 causes the BT search component 22 to start a search procedure, which will be described further below with reference to FIG. 3.

In case at least one BT-ID entry is found (step 103), a list is presented to the user of mobile phone 1 on the display 11 (step 104). The list comprises for each BT-ID entry found in the vCards 32 the contact person name and the device name or device names that are associated in the vCard to the found BT-IDs. The list comprises for each BT-ID entry found in the contact cards 33 the device name that is associated in the contact card to the found BT-ID. The list may thus comprise for example the entries 'user A, mobile phone', 'user A, laptop', 'user B, mobile phone', 'user C, mobile phone', 'printer X' and 'printer Y'. In addition, the BT selection component 21 presents on the display 11 a 'selection' option in a first CBA and a 'search' option in a second CBA. Either option may be selected with a respectively associated softkey of the input means 12.

The user may now mark one device in the displayed list and use the 'selection' option for setting up a Bluetooth™ connection to the marked device.

In case the user does not select one of the devices in the list for a Bluetooth™ connection (step 105), but selects the 'BT-search' option (step 106), for instance because the user does not find a desired device in the list, the BT selection component 21 causes the BT search component 22 to start a search procedure, which will be described later on with reference to FIG. 3.

In case the user uses the 'selection' option for one of the indicated devices in the list (step 105), the BT selection component 21 tries to establish a Bluetooth™ connection with the selected device (step 107). The user knows devices 2, 3 and 4 to be in the vicinity and selects therefore one of these devices.

In case the Bluetooth™ connection could be established successfully (step 108), it may now be used for a Bluetooth™, for instance for transmitting a file to the selected device (step 109).

In case the Bluetooth™ connection could not be established successfully (step 108), for example because the selected device is currently not located in the vicinity, the BT selection component 21 displays an error message on the display 11 (step 110).

It is to be noted that in the above example for step 104, the list could alternatively comprise only the main entries 'user A', 'user B', 'user C', 'printer'. In an intermediate step, the user could then select one of these entries, upon which subentries are presented, if any. For example, upon selection of entry 'user A', a list with the subentries 'mobile phone' and 'laptop' would be presented, from which the user may now chose (step 105). Upon selection of entry 'user B', either a single subentry 'mobile phone' could be presented, or the procedure could proceed immediately with step 105.

A second operation in the system of FIG. 1 will now be described with reference to FIG. 3. FIG. 3 is a flow chart illustrating the search procedure mentioned above and performed by the BT search component 22.

The menu of the mobile phone 1 enables a user to initiate a Bluetooth™ search. For instance, while the user is viewing a vCard that is available for a particular contact person, and a BT-field of the vCard is active, a CBA option 'BT search' may be presented to a user on the display 11. The option 'BT search' may then be selected by an associated softkey of the input means 12 for initiating Bluetooth™ search.

In case the BT search component 22 detects that a user initiated a Bluetooth™ search, for example by selecting a 'BT search' option (step 201), the BT search component 22 performs a conventional inquiry procedure for all BT enabled device in the vicinity, as described above (step 202). It has to be noted that the inquiry procedure may also be initiated by the BT selection component 21 during a selection procedure described with reference to FIG. 2, namely in step 103 or step 106. Therefore step 201 is indicated with dashed lines.

The BT search component 22 presents a list with all Bluetooth™ enabled devices found in the inquiry procedure on the display 11. The list may comprise for instance the respective device type and/or a device name selected by the user of the device. In addition, it offers an 'add to contact' option in a CBA on the display 11.

When the user marks one of the Bluetooth™ enabled devices in the displayed list and selects the 'add to contact' option by an associated softkey (step 204), the BT search component 22 adds the BT-ID corresponding to the selected Bluetooth™ enabled device to the BT-field of a vCard 32 or a contact card 33 (step 205).

The user may add a device name to the vCard 32 or to the contact card 33, respectively, for instance before the search procedure. In case no device name is entered before the search, a device name and/or a device type received by the respective device in the search (step 202) can be employed provisionally and be amended by the user as desired. Further, in case the search procedure is not started proceeding from a displayed vCard 32 or contact card 33, for example because the search is initiated by the BT selection component 21, the user may first be asked whether the BT-ID that is associated to the selected device is to be added to a vCard 32 or to a contact card 33.

Once the BT-ID and any other desired information has been added in the contact database 30, the BT search component 22 causes the BT selection component 22 to start a selection procedure presented with reference to FIG. 2—starting off with step 102. In this procedure, the updated list of Bluetooth™ enabled devices with available BT-IDs is presented to a user. The user may then select the correct Bluetooth™ enabled device from the list.

It is to be understood that in addition, a user may be enabled to enter a known BT-ID manually to a vCard 32 or to a contact card 33. Further, a BT-ID could be transmitted, for instance via Infrared or via a short message service (SMS), in the scope of a vCard from one device to the other. Further, an option to store a BT-ID of another device 2, 3, 4, 5 in a contact card or vCard could be offered automatically to a user, whenever such another device 2, 3, 4, 5 is trying to create or has already created a Bluetooth™ connection to the mobile phone 1, for example in order to transmit a file to the mobile phone 1. FIG. 3 indicates the latter option (step 301) followed by a possible user selection (step 302) with dashed lines. It has to be noted that in this case, the selection procedure should rather not be called upon the storage in step 205.

With the presented methods, a user may easily select known Bluetooth™ enabled devices from a list, and also update the list in an easy manner. The overall time required for a Bluetooth communication is reduced.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus comprising:
    a contact database configured to store Bluetooth™ identifiers identifying Bluetooth™ enabled devices; and
    a processor configured to search in said contact database for stored Bluetooth™ identifiers; configured to present to a user a list of entries associated in said contact database to Bluetooth™ identifiers found in a search; configured to enable a user to select a presented entry; configured to present upon a user selection of a presented entry a list of subentries stored in said contact database, at least when a plurality of Bluetooth™ identifiers are associated to said entry; configured to enable a user to select a presented subentry; and configured to set up a Bluetooth™ connection to a Bluetooth™ enabled device, which Bluetooth™ enabled device is identified by a stored Bluetooth™ identifier that is associated in said contact database to a subentry selected by a user.

2. The apparatus according to claim 1, wherein each entry and each subentry comprises at least one of:
    a contact person name;
    a device type; and
    a device name.

3. The apparatus according to claim 1, wherein each Bluetooth™ identifier and each associated entry in said contact database form parts of a respective contact card.

4. The apparatus according to claim 1, wherein said processor is further configured to store a Bluetooth™ identifier identifying a Bluetooth™ enabled device in said contact database.

5. The apparatus according to claim 4,
    wherein said processor is further configured to perform an inquiry procedure for obtaining Bluetooth™ identifiers of Bluetooth™ enabled devices in the vicinity of said Bluetooth™ enabled device;

wherein said processor is configured present to a user a list of Bluetooth™ enabled devices for which Bluetooth™ identifiers have been obtained; and wherein said processor is configured to store Bluetooth™ identifiers associated to Bluetooth™ enabled devices selected from a list in said contact database.

6. The apparatus according to claim 5, wherein said processor is configured to perform an inquiry procedure in case no Bluetooth™ identifier is found in said contact database during a search for Bluetooth™ identifiers.

7. The apparatus according to claim 5, wherein said processor is configured to perform an inquiry procedure upon an initiation by a user, while said user has called a contact card from said database; and wherein said processor is configured to store a Bluetooth™ identifier associated to a selected Bluetooth™ enabled device in said contact database as a part of said contact card.

8. The apparatus according to claim 4, wherein said processor is further configured to continue automatically with a search in said contact database for stored Bluetooth™ identifiers upon storage of a new Bluetooth™ identifier in said contact database.

9. The apparatus according to claim 1, wherein said processor is further configured to offer to a user an option to store a Bluetooth™ identifier of a Bluetooth™ enabled device, which Bluetooth™ enabled device is trying to establish a Bluetooth™ connection to said apparatus or has established a Bluetooth™ connection to said apparatus and which Bluetooth™ enabled device has provided in this scope its own Bluetooth™ identifier; and to store said Bluetooth™ identifier in said contact database upon a user request.

10. The apparatus according to claim 1, wherein said apparatus is a mobile phone.

11. The apparatus according to claim 1, wherein said apparatus is a laptop.

12. A contact database for a Bluetooth™ enabled device, said contact database being configured to store Bluetooth™ identifiers identifying other Bluetooth™ enabled devices, to store selectable entries and to store selectable subentries, wherein each stored selectable subentry is associated to a stored selectable entry, and wherein each stored Bluetooth™ identifier is associated at least to a stored selectable entry and, when at least one stored selectable subentry is associated to said entry, in addition to a stored selectable subentry that is associated to said stored selectable entry.

13. A method comprising at a first Bluetooth™ enabled device:

searching in a contact database for stored Bluetooth™ identifiers identifying other Bluetooth™ enabled devices;

presenting to a user a list of entries associated in said contact database to Bluetooth™ identifiers found in a search;

enabling a user to select a presented entry;

presenting upon a user selection of a presented entry a list of subentries stored in said contact database, at least when a plurality of Bluetooth™ identifiers are associated to said entry;

enabling a user to select a presented subentry; and setting up a Bluetooth™ connection to another Bluetooth™ enabled device, which other Bluetooth™ enabled device is identified by a stored Bluetooth™ identifier that is associated in said contact database to a subentry selected by a user.

14. The method according to claim 13, wherein each entry comprises at least one of:
a contact person name;
a device type; and
a device name.

15. The method according to claim 13, wherein each Bluetooth™ identifier and each associated entry in said contact database form parts of a contact card.

16. The method according to claim 13, wherein in case no Bluetooth™ identifier is found in said contact database during said search, said method further comprising:

performing an inquiry procedure for obtaining Bluetooth™ identifiers of Bluetooth™ enabled devices in the vicinity of said first Bluetooth™ enabled device;

presenting to a user a Bluetooth™ enabled device for which a Bluetooth™ identifier has been obtained; and storing a Bluetooth™ identifier identifying a presented Bluetooth™ enabled device in said contact database upon a request by a user.

17. A method comprising in a first Bluetooth™ enabled device:

storing a Bluetooth™ identifier identifying another Bluetooth™ enabled device in a contact database of said first Bluetooth™ enabled device;

storing selectable entries in said contact database;

storing selectable subentries in said contact database;

associating each stored selectable subentry to a stored selectable entry; and associating each stored Bluetooth™ identifier at least to a stored selectable entry and, when at least one stored selectable subentry is associated to said entry, in addition to a stored selectable subentry that is associated to said stored selectable entry.

18. The method according to claim 17, further comprising:

performing an inquiry procedure for obtaining Bluetooth™ identifiers, which Bluetooth™ identifiers identify Bluetooth™ enabled devices located in the vicinity of said first Bluetooth™ enabled device;

presenting to a user a Bluetooth™ enabled device for which a Bluetooth™ identifier has been obtained; and storing a Bluetooth™ identifier identifying a presented Bluetooth™ enabled device in said contact database upon a request by a user.

19. The method according to claim 18, wherein presenting to a user a Bluetooth™ enabled device comprises presenting to a user a list of all Bluetooth™ enabled devices for which Bluetooth™ identifiers have been obtained, and wherein storing a Bluetooth™ identifier in said contact database comprises storing a Bluetooth™ identifier associated to a Bluetooth™ enabled device selected from said list.

20. The method according to claim 18, wherein said inquiry procedure is initiated by a user while having called a contact card from said database, and wherein a Bluetooth™ identifier associated to a selected Bluetooth™ enabled device is stored in said contact database as a part of said contact card.

21. The method according to claim 18, further comprising:

searching in said contact database for stored Bluetooth™ identifiers identifying other Bluetooth™ enabled devices;

presenting to a user a list of entries associated in said contact database to Bluetooth™ identifiers found in said search; and enabling a user to select of one of said presented entries for setting-up a Bluetooth™ connection to another Bluetooth™ enabled device identified by a Bluetooth™ identifier that is associated to said selected entry.

22. The method according to claim 17, further comprising:
offering to a user an option to store a Bluetooth™ identifier of another Bluetooth™ enabled device, which other Bluetooth™ enabled device is trying to establish a Bluetooth™ connection to said Bluetooth™ enabled device or has established a Bluetooth™ connection to said Bluetooth™ enabled device and which other Bluetooth™ enabled device has provided in this scope its own Bluetooth™ identifier; and storing said Bluetooth™ identifier in said contact database upon a user request.

23. A software program product in which a software code is stored in a readable memory, said software code realizing the following when being executed by a processor of a first Bluetooth™ enabled device:

searching in a contact database for stored Bluetooth™ identifiers identifying other Bluetooth™ enabled devices;

presenting to a user a list of entries associated in said contact database to Bluetooth™ identifiers found in a search;

enabling a user to select a presented entry;

presenting upon a user selection of a presented entry a list of subentries stored in said contact database, at least when a plurality of Bluetooth™ identifiers are associated to said entry;

enabling a user to select a presented subentry; and setting up a Bluetooth™ connection to another Bluetooth™ enabled device, which other Bluetooth™ enabled device is identified by a stored Bluetooth™ identifier that is associated in said database to a subentry selected by a user.

24. The software program product according to claim 23, said software code further realizing the following when being executed by a processor of said first Bluetooth™ enabled device:

performing an inquiry procedure for obtaining Bluetooth™ identifiers of Bluetooth™ enabled devices in the vicinity of said Bluetooth™ enabled device;

presenting to a user a list of Bluetooth™ enabled devices for which Bluetooth™ identifiers have been obtained; and storing Bluetooth™ identifiers associated to Bluetooth™ enabled devices selected from a list in said contact database.

25. The software program product according to claim 24, wherein said inquiry procedure is performed in case no Bluetooth™ identifier is found in said contact database during a search for Bluetooth™ identifiers.

26. An apparatus comprising:

means for searching in a contact database for stored Bluetooth™ identifiers identifying other Bluetooth™ enabled devices;

means for presenting to a user a list of entries associated in said contact database to Bluetooth™ identifiers found in a search;

means for enabling a user to select a presented entry;

means for presenting upon a user selection of a presented entry a list of subentries stored in said contact database, at least when a plurality of Bluetooth™ identifiers are associated to said entry;

means for enabling a user to select a presented subentry; and means for setting up a Bluetooth™ connection to another Bluetooth™ enabled device, which other Bluetooth™ enabled device is identified by a stored Bluetooth™ identifier that is associated in said contact database to a subentry selected by a user.

\* \* \* \* \*